US012618442B2

(12) United States Patent (10) Patent No.: US 12,618,442 B2
Adamczak et al. (45) Date of Patent: May 5, 2026

(54) FILTRATION SYSTEM WITH COLLECTOR TRAY

(71) Applicant: TALLANO TECHNOLOGIE, Paris (FR)

(72) Inventors: Loïc Adamczak, Boulogne Billancourt (FR); Adrien Maistre, Boulogne Billancourt (FR)

(73) Assignee: TALLANO TECHNOLOGIE, Paris (FR)

( * ) Notice: Subject to any disclaimer, the term of this patent is extended or adjusted under 35 U.S.C. 154(b) by 393 days.

(21) Appl. No.: 18/251,797

(22) PCT Filed: Oct. 29, 2021

(86) PCT No.: PCT/EP2021/080210
§ 371 (c)(1),
(2) Date: May 4, 2023

(87) PCT Pub. No.: WO2022/101040
PCT Pub. Date: May 19, 2022

(65) Prior Publication Data
US 2023/0407929 A1 Dec. 21, 2023

(30) Foreign Application Priority Data
Nov. 12, 2020 (FR) ..................................... 2011583

(51) Int. Cl.
*F16D 65/00* (2006.01)
*B01D 46/70* (2022.01)
(Continued)

(52) U.S. Cl.
CPC ......... *F16D 65/0031* (2013.01); *B01D 46/70* (2022.01); *B01D 46/76* (2022.01); *B60T 17/221* (2013.01)

(58) Field of Classification Search
CPC ... F16D 65/0031; B60T 17/221; B01D 46/76; B01D 46/70
See application file for complete search history.

(56) References Cited

U.S. PATENT DOCUMENTS 4,235,611 A 11/1980 Brownell
4,780,927 A 11/1988 Clayton
(Continued)

FOREIGN PATENT DOCUMENTS

DE 102018207295 A1 11/2019
EP 1340446 A1 9/2003
(Continued)

OTHER PUBLICATIONS

Canadian Patent No. CA 3117489 to Adamczak et al published on May 14, 2020.*
(Continued)

*Primary Examiner* — Pamela Rodriguez
(74) *Attorney, Agent, or Firm* — NIXON & VANDERHYE

(57) ABSTRACT

Disclosed is a system for capturing braking particles from a friction braking system, which includes a vacuum source, a pneumatic circuit which connects the friction braking system to the vacuum source, and a particle filtration system located on the pneumatic circuit and including a support and a filter which is mounted on the support and which, during operation, becomes clogged with particles, preferentially on the surface. The capture system further includes a storage container which is able to receive particles that become detached from the filter.

20 Claims, 4 Drawing Sheets

(51) Int. Cl.
   *B01D 46/76* (2022.01)
   *B60T 17/22* (2006.01)

(56) References Cited

U.S. PATENT DOCUMENTS

| | | | | |
|---|---|---|---|---|
| 8,926,738 B2 * | 1/2015 | Lupica | .................. | F16D 65/092 |
| | | | | 188/218 XL |
| 2002/0112458 A1 | 8/2002 | Schneider et al. | | |
| 2014/0262633 A1 | 9/2014 | Kunzler et al. | | |

FOREIGN PATENT DOCUMENTS

| | | | |
|---|---|---|---|
| FR | 3088392 | A1 | 5/2020 |
| GB | 2286665 | A | 8/1995 |
| JP | S5617428 | U | 2/1981 |
| JP | H0399243 | U | 10/1991 |
| JP | H08224424 | A | 9/1996 |
| JP | 2000189735 | A | 7/2000 |
| JP | 2003220314 | A | 8/2003 |
| KR | 102094306 | B1 | 3/2020 |
| KR | 20200089119 | A | 7/2020 |
| WO | 8102690 | A1 | 10/1981 |
| WO | 2005053497 | A1 | 6/2005 |
| WO | 2008049829 | A1 | 5/2008 |
| WO | 2015199412 | A1 | 12/2015 |

OTHER PUBLICATIONS

Translation of German Patent No. DE 102018207295 obtained from database PE2E on Jul. 29, 2025.*
Translation of French Patent No. FR 3088392 obtained from database PE2E on Jul. 29, 2025.*
Translation of Korean Patent No. KR 102094306 obtained from database PE2E on Jul. 29, 2025.*
Notification of Opposition issued in France Patent Application No. FR3116001 dated Oct. 9, 2023.
Sparks et al., "Filters and Filtration Handbook (Sixth Edition)", Section 3—Air and Gas Filtration, 2016, pp. 1-82.
Wikipedia, "Baghouse", Retrieved from "https://en.wikipedia.org/w/index.php?title=Baghouse&oldid=961637646", Jun. 9, 2020, pp. 1-6.
Wikipedia, "Dust collector", Retrieved from "https://en.wikipedia.org/w/index.php?title=Dust_collector&oldid=986272578", Oct. 30, 2020, pp. 1-14.
Wear Karen, "Optimizing Dust Collector Filter Cleaning Technology", https://www.donaldson.com/en-us/industrial-dust-fume-mist/technical-articles/optimizing-dust-collector-filter-cleaning-technology/ Printed Apr. 20, 2023, 5 pages.
International Search Report for PCT/EP2021/080210 mailed Jan. 28, 2022, 6 pages.
Written Opinion of the ISA for PCT/EP2021/080210 mailed Jan. 28, 2022, 6 pages.
Office Action issued in Japanese Patent Application No. 2023-528310 dated Sep. 30, 2025.
Office Action, issued in Singaporean Patent Application No. 11202303706R dated Aug. 30, 2025.

\* cited by examiner

[Fig. 1]
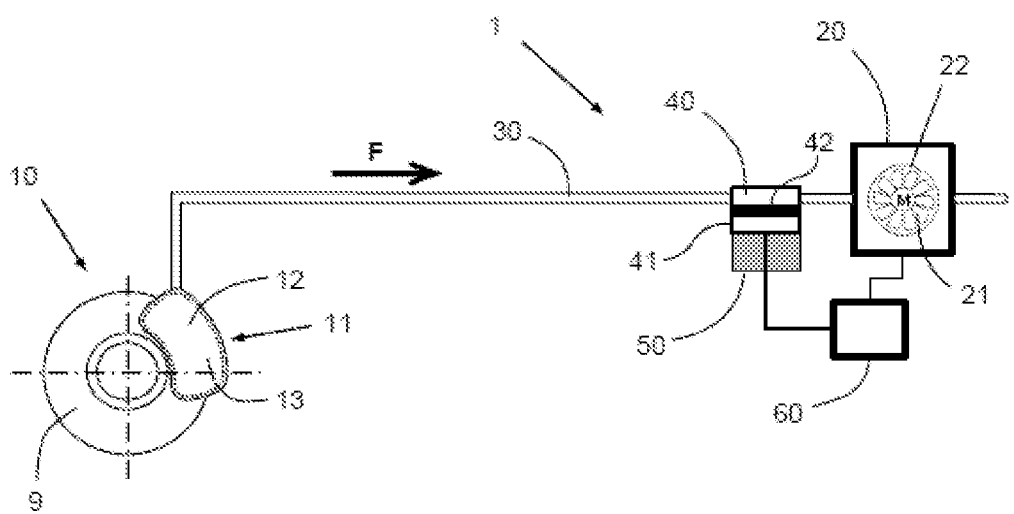

[Fig. 2]
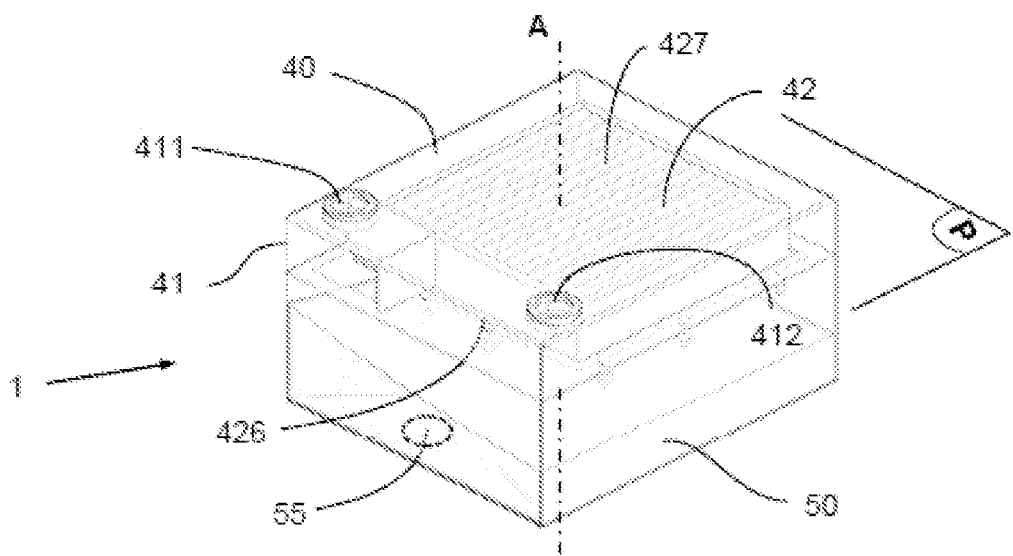
[Fig. 3]
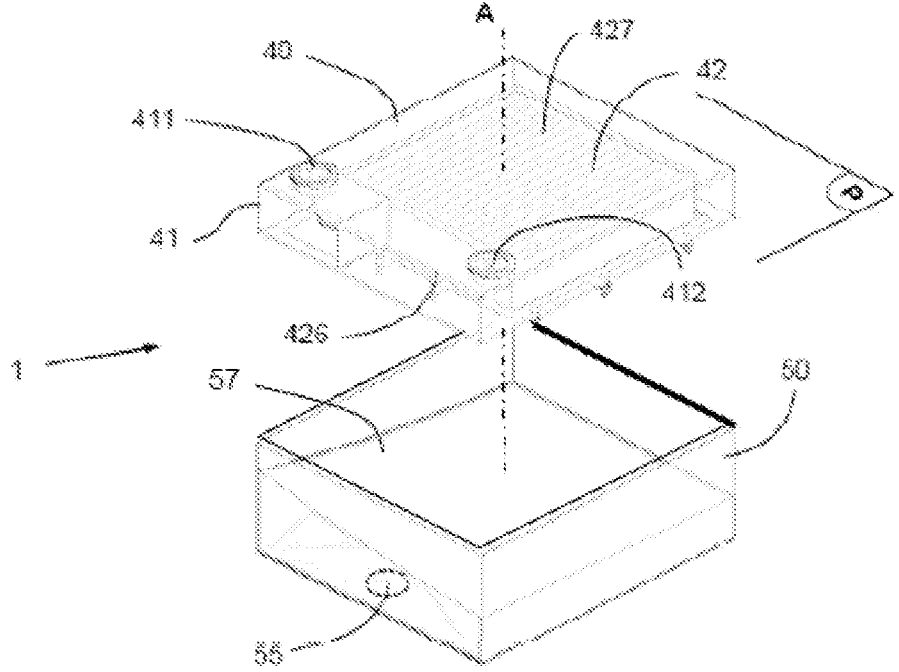

[Fig. 4]
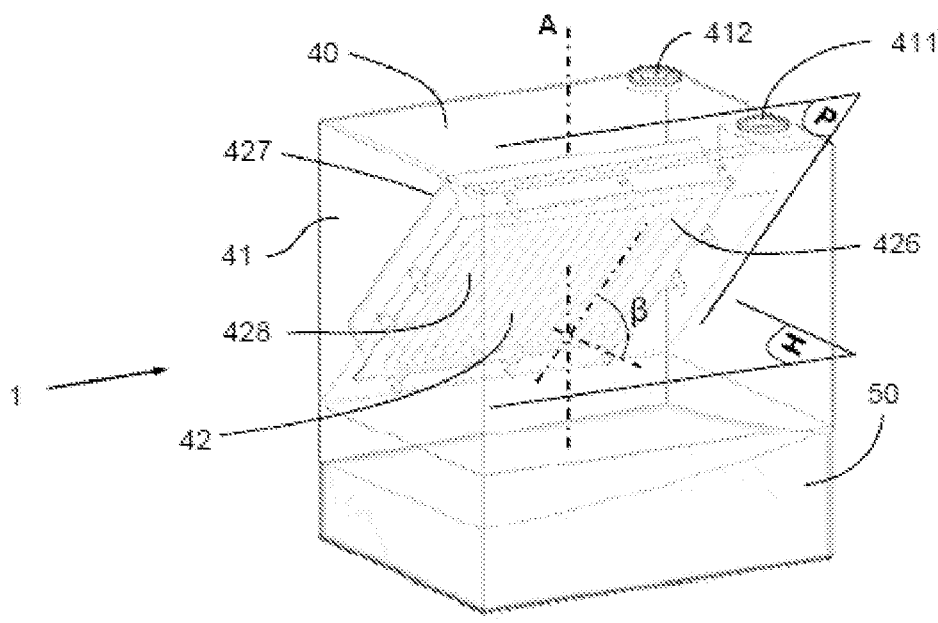
[Fig. 5]
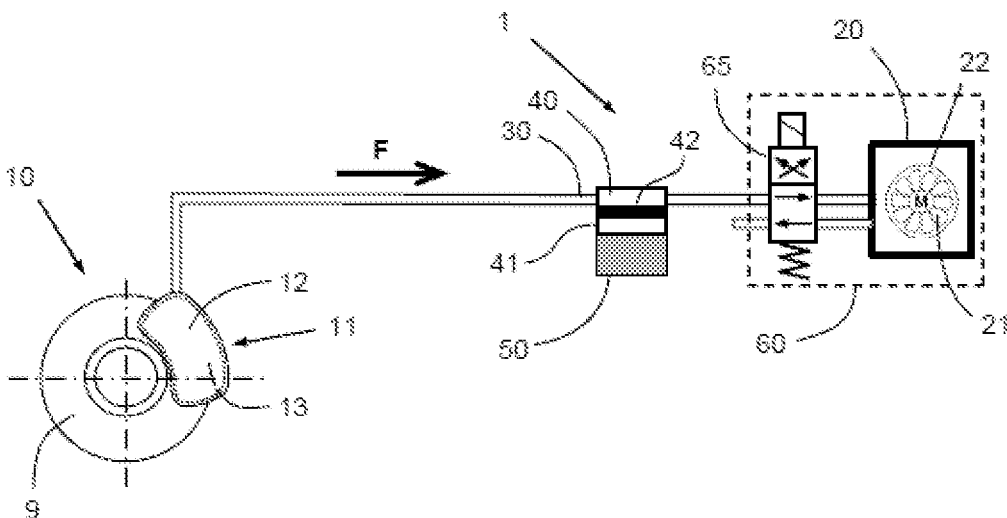

[Fig. 6]
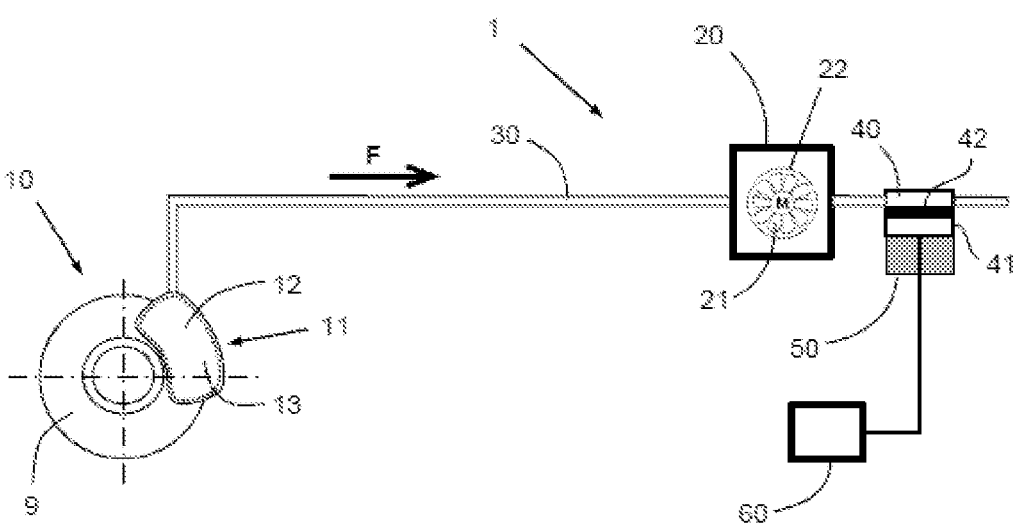

FILTRATION SYSTEM WITH COLLECTOR TRAY

This application is the U.S. national phase of International Application No. PCT/EP2021/080210 filed Oct. 29, 2021, which designated the U.S. and claims priority to FR Patent Application No. 2011583 filed Nov. 12, 2020, the entire contents of each of which are hereby incorporated by reference.

The present invention relates to a system for capturing braking particles from a friction braking system, which comprises a vacuum source, a pneumatic circuit which connects said friction braking system to the atmosphere, the vacuum source being located on the pneumatic circuit, and a particle filtration system which is located on the pneumatic circuit and which comprises a filter which becomes clogged with particles during operation, preferentially on the surface.

Such friction braking systems can be fitted to road or rail vehicles. Such friction braking systems can also be fitted to stationary rotor machines such as wind turbines or industrial machines.

In such systems, a vacuum source is provided (for example a suction turbine driven by a motor) which is connected by a pneumatic circuit to the friction braking system, as well as a filter for collecting particles which are emitted by the braking system. The pneumatic circuit continues downstream from the vacuum source and leads to the atmosphere. The filter is placed upstream of the vacuum source, and prevents particles from passing through the vacuum source and being released into the atmosphere. This filter can also be placed downstream of the vacuum source, in which case it also prevents the release of particles into the atmosphere. Such a filter collects particles through its entire volume (i.e. through its entire thickness). However, the pressure drop from these filters increases as particles and dust are deposited inside the filter and on the surface. Eventually the pressure drop across the filter becomes too great for air to flow through. This is called filter clogging. Replacement of the filter is then necessary. This replacement requires a maintenance operation, and additional costs. Such a filter is described in document US 2002/112458.

One solution to overcome this problem is to remove dust from the filter regularly, before it clogs, in order to extend its service life. With this in view, it is advantageous to use a surface filter, i.e. a filter which clogs preferentially or even solely on its outermost layer (outermost layer upstream relative to the direction of the air flow). These are filters comprising, for example, a layer of PTFE (Polytetrafluoroethylene) or of cellulose nanofibers on the surface. In effect, dust on the surface of the filter comes off more easily than dust stored inside the filter. The operation of dust removal (referred to as unclogging) from the filter is facilitated.

However, during periods of operation of the system of equal duration, the amount of particles that can be retained by such filters is less than the storage capacity of filters which collect particles throughout their entire volume. The problem therefore arises of removing these particles so that the filter continues to operate optimally and has a longer service life.

DESCRIPTION OF THE INVENTION

The present invention aims to remedy these disadvantages.

The invention aims to provide a system for capturing braking particles from a friction braking system, in which the filter provides optimized efficiency and service life.

This object is achieved due to the fact that the capture system further comprises a storage container which is capable of receiving the particles which become detached from the filter.

By means of these arrangements, the particles stopped by the filter are regularly stored in a separate area of the filter. The filter is thus regularly unclogged and retains its filtration capacity. Maintenance of the filter is also facilitated since the particles are removed by regularly emptying the storage container.

Advantageously, the capture system further contains an unclogging device for the filter that is able to cause the particles to fall into the storage container.

The particles are thus regularly detached from the filter, which extends the service life of the filter and therefore of the capture system.

For example, this unclogging device is a vibrator which is able to cause the filter to vibrate.

For example, this unclogging device comprises a generator of an airflow that passes through the filter.

For example, this generator is the vacuum source.

Advantageously, the storage container and the support form a closed space.

The particles accumulated in the filter and the particles contained in the storage container thus cannot escape into the atmosphere.

Advantageously, the storage container is removable from the support.

The storage container can thus be emptied of the particles that have accumulated in it, and then reassembled with the support.

For example, the filter extends mainly within a plane P which is horizontal.

For example, the filter extends mainly within a plane P which forms, with a horizontal plane H, a non-zero angle $\beta$ which is less than or equal to 90°.

Advantageously, the storage container comprises a closure mechanism which makes it possible to prevent the particles from coming into contact with an external operator.

The operator thus has no contact with the particles (which are toxic) during handling of the storage container.

For example, the vacuum source is located on the part of the pipe which connects the braking system to the filtration system.

The invention will be properly understood and its advantages will become more apparent upon reading the following detailed description of some embodiments shown by way of non-limiting examples. The description refers to the accompanying drawings, in which:

FIG. 1 is a schematic view of a capture system according to the invention.

FIG. 2 is a perspective view of the capture system, showing the filtration system and storage system when assembled.

FIG. 3 is a perspective view of the capture system, showing the filtration system and storage system when disassembled.

FIG. 4 is a perspective view of the capture system according to another embodiment.

FIG. 5 is a schematic view of another embodiment of the capture system according to the invention.

FIG. 6 is a schematic view of yet another embodiment of the capture system according to the invention.

DETAILED DESCRIPTION OF THE INVENTION

FIG. 1 schematically represents a particle capture system 1 according to the invention, these particles being emitted by a friction braking system 10.

This friction braking system 10 comprises a brake pad 11 for braking a vehicle. This pad 11 comprises a backing plate 12 and a lining 13 made of friction material fixed to the backing plate 12. In FIG. 1, pad 10 is seen from below, backing plate 1 being in the foreground.

Pad 11 (first pad) is facing a disc 9 which is driven by the wheel of the vehicle or of a machine. A second identical pad (not visible) is located on the other side of disc 9 and facing first pad 11 such that these two pads sandwich disc 9. The braking of disc 9 is achieved by friction of the two linings 13 against disc 9 when the two pads approach disc 9.

Capture system 1 comprises a pneumatic circuit 30 and a vacuum source Pad 11 and second pad are connected to vacuum source 20 via pneumatic circuit 30. For example, vacuum source 20 comprises an electric motor 21 and a suction turbine 22 which is driven by electric motor 21. Pneumatic circuit 30 therefore extends from friction braking system 10 to vacuum source 20 then continues downstream of vacuum source 20 and leads to the atmosphere (exterior).

During operation, vacuum source 20 is capable of suctioning up the particles when they are emitted by linings 13, then through pneumatic circuit 30. The direction of circulation of the air and the particles during normal operation is indicated by arrow F in FIG. 1. Arrow F therefore indicates a flow from upstream to downstream. The capture system further comprises a filtration system 40 which comprises a support 41 and a filter 42. Filtration system 40 is located on circuit 30, meaning that filter 42 is crossed by the air which is circulating in circuit 30. Filter 42 is mounted on support 41 which is fixed in a sealed manner on pipe 30, so that support 41 forms an open space only upstream and downstream in circuit 30, and in storage container 50 described below. The particles thus tend to remain within this space. Filtration system 40 is advantageously located upstream of vacuum source 20 in order to prevent, as much as possible, the particles from passing through vacuum source 20. This variant is represented in FIG. 1. Alternatively, filtration system 40 is located downstream of vacuum source 20 on pipe 30, meaning that vacuum source 20 is located on the part of pipe 30 which connects braking system 10 to filtration system 40. This variant is shown in FIG. 6.

FIGS. 2 and 3 are perspective views of the capture system, showing filtration system 40 and storage system 50. In FIG. 2, filtration system 40 and storage system 50 are shown assembled together. In FIG. 3, filtration system 40 and storage system 50 are shown disassembled. For example, support 41 is a housing in which filter 42 is housed. Thus, filter 42 separates housing 41 into an upstream part and a downstream part. The air coming from the upstream part of circuit 30 enters housing 41 through an inlet port 411 at the upstream part of housing 41. The air passes through filter 42, and exits housing 41 at the downstream part of housing 41 through an outlet port 412, to enter the downstream part of circuit 30. Both ports (411, 412) are located on the same face of housing 41. Alternatively, both ports (411, 412) are each located on an opposite face of housing 41.

Capture system 1 further comprises a storage container 50. Storage container 50 is integral with support 41, and is intended to receive and store the particles which become detached from filter 42. In FIG. 2, support 41 is a housing, and housing 41 and storage container 50 form a closed space (except for the inlet and outlet ports (411, 412)). The join between housing 41 (or more generally support 41) and storage container 50 is sealed (for example using a gasket) in order to prevent the particles from escaping.

Storage container 50 is removable from housing 41. Thus, container 50 can be emptied easily and then be reattached to housing 41. For emptying, storage container 50 is advantageously provided with a lid (see below). In FIG. 3, container 50 is shown detached from housing 41. In FIG. 2, container 50 is shown secured to housing 41. Storage container 50 can alternatively form a single assembly with housing 41. In both cases, storage container 50 can have an emptying port 55 (visible as dotted lines in FIGS. 2 and 3) which is closed during operation, and which can be opened in order to empty the particles from container 50. Emptying port 55 is for example on the inside face (along the vertical axis A) of housing 50. Thus, in the case of a removable container 50, container 50 can be emptied without detaching it from housing 41. This emptying of container 50 can be assisted by a particle suction device connected to this emptying port 55.

Filter 42 has a lower face 426, an upper face 427, and a side edge which joins these two faces. The terms "lower" and "upper" are defined with respect to the vertical (vertical axis A) during operation. A horizontal plane H is defined as being perpendicular to this vertical axis A. These two faces are parallel and extend parallel to a plane P. These two faces are separated by a distance which is the thickness of filter 42. Each of the two faces has a width and a length (or dimensions) in plane P which are greater (or even much greater, i.e. at least five times greater) than the thickness. Thus, filter 42 is said to extend mainly in plane P.

During operation, air passes through filter 42 from its lower face 426 to its upper face 427, so that particles accumulate on lower face 426. The particles are thus able to fall due to gravity into storage container 50, which is fixed to housing 41 at the lower face 426 side. Storage container 50 is thus facing lower face 426.

In the embodiment of FIGS. 2 and 3, filter 42 is positioned in housing 41 (or more generally on support 41) so that plane P in which filter 42 extends is horizontal.

During operation, storage container 50 is always located below filter 42. Thus, simply by gravity, the particles regularly become detached from lower face 426 of filter 42 and fall into container 50. The action of gravity is assisted by vibrations of the vehicle or machine. The unclogging of filter 42 thus takes place naturally during operation.

Advantageously, capture system 1 also contains a device 60 for unclogging filter 42 which is capable of causing the particles to fall from filter 42 into storage container 50. This unclogging device 60 (schematically represented in FIG. 1) is connected to support 41 (or directly to filter 42) and its action thus complements the action of gravity. For example, unclogging device 60 comprises an air flow generator. This generator is for example a fan which blows air in the direction of lower face 426 in order to detach the particles therefrom. In this case, unclogging device 60 comprises a pipe and a nozzle at the end of this pipe (not shown), this nozzle making it possible to direct the flow of air from the generator towards filter 42. This generator is for example a vacuum extractor which generates a flow of air moving away from lower face 426 in order to suction particles away from lower face 426. Alternatively, the generator is a fan which blows air in the direction of upper face 427 (against the flow) in order to detach the particles.

The generator is for example vacuum source 20, which is then connected to filter 42 by a pipe, which avoids using a separate source of air. An example of this embodiment is shown in FIG. 5. In this case, the generator is associated with a solenoid valve 65 which is mounted on pipe 30 which already connects filtration system 40 (upstream) and vacuum source 20 (downstream), and which is also mounted on pipe 30 downstream of vacuum source 20. For example, solenoid valve 65 also allows modulating the power of the air flow.

During normal operation (represented in FIG. 5), air circulates in circuit 30 of filtration system 40 towards vacuum source 20 then exits to the outside (the direction of circulation of the air is indicated by the arrows on solenoid valve 65). During the unclogging operation, air circulates through solenoid valve 65 in the opposite direction (the direction of the arrows on solenoid valve 65 would then be reversed with respect to FIG. 5). Vacuum source 20 thus draws in air from the outside to direct it towards filter 42 in order to detach the particles.

Additionally or alternatively, unclogging device 60 is a vibrator which is able to vibrate filter 42 in a manner that detaches the particles.

FIG. 4 shows another embodiment of the invention. Filter 42 extends mainly in a plane P which forms, with horizontal plane H, a non-zero angle β which is less than or equal to, or strictly less than, 90°. Filter 42 is therefore inclined relative to the horizontal. In this case, filter 42 is advantageously oriented such that the folds 428 of filter 42 extend in vertical planes in order to facilitate the falling of the particles into storage container 50. In the embodiment of FIGS. 2 and 3, filter 42 is in a horizontal position. This corresponds to the case where the angle β is zero (i.e. equal to 0°).

Advantageously, housing 41 (or more generally support 41) is provided with a closure mechanism which seals housing 41 closed in order to prevent any contact of the particles with the operator. The various openings on the outside of housing 41 are thus able to be sealed closed. In particular, inlet port 411 and outlet port 412 are able to be closed by plugs, and the opening of housing 41 towards storage container 50 is able to be closed by a closure (for example a cover provided with a peripheral gasket).

It is also advantageous for storage container 50 to be fitted with a sealing mechanism which seals storage container 50 closed in order to avoid any contact of the particles with the operator. In particular, emptying port 55 is capable of being sealed closed by a plug. Also, the face of the storage container which is open to the outside (for example the upper face) when storage container 50 is detached from housing 41, is capable of being closed by a cover 57. For example, cover 57 is hinged to a side wall of storage container 50 and comprises a single swinging flap which covers the entire upper face of container 50, as illustrated in FIG. 3 (lid in the closed position). Alternatively, cover 57 comprises two flaps which swing down onto the upper face of container 50 in order to close it. The closure of storage container 50 by a closure mechanism can be carried out in addition to, or instead of, a closure of housing 41 by another closure mechanism.

During operation, or during maintenance, storage container 50 is disassembled, emptied, and assembled to support 41 multiple times during the service life of filter 42. In some cases, storage container 50 can be sized so that it does not need to be emptied for the entire service life of filter 42. In this case, storage container 50 is changed, and filter 42 is emptied or changed, simultaneously. It is then advantageous for storage container 50 to be fixed to support 41 and non-removable, and for this support to be housing 41. The manufacture of capture system 1 is thereby simplified.

The invention claimed is:

1. A capture system for capturing braking particles from a friction braking system, the capture system comprising:
   a pneumatic circuit which connects said friction braking system to the atmosphere;

a vacuum source disposed on said pneumatic circuit;
   a filtration system for said braking particles which is disposed on said pneumatic circuit, the filtration system comprising
      a support, and
      exactly one filter mounted on said support, the filter being configured to become clogged by said particles during operation; and
   a storage container configured to receive said particles which become detached from said filter, the storage container having an emptying port which is closed during operation by a plug, the emptying port being configured to be opened in order to empty the particles from the storage container.

2. The capture system according to claim 1, further comprising an unclogging device for said filter that is able to cause said particles to fall into said storage container.

3. The capture system according to claim 2, wherein said unclogging device is a vibrator configured to cause said filter to vibrate.

4. The capture system according to claim 3, wherein said unclogging device comprises a generator of an air flow that passes through said filter.

5. The capture system according to claim 4, wherein said generator is the vacuum source.

6. The capture system according to claim 5, wherein said storage container and said support form a closed space.

7. The capture system according to claim 4, wherein said storage container and said support form a closed space.

8. The capture system according to claim 3, wherein said storage container and said support form a closed space.

9. The capture system according to claim 2, wherein said unclogging device comprises a generator of an air flow that passes through said filter.

10. The capture system according to claim 9, wherein said generator is the vacuum source.

11. The capture system according to claim 10, wherein said storage container and said support form a closed space.

12. The capture system according to claim 9, wherein said storage container and said support form a closed space.

13. The capture system according to claim 2, wherein said storage container and said support form a closed space.

14. The capture system according to claim 2, wherein said storage container is removable from said support, a face of the storage container which is open to an outside when the storage container is detached from the support, is capable of being closed by a cover, the cover being hinged to a sidewall of the storage container.

15. The capture system according to claim 1, wherein said storage container and said support form a closed space.

16. The capture system according to claim 1, wherein said storage container is removable from said support, a face of the storage container which is open to an outside when the storage container is detached from the support is configured to being closed by a cover.

17. The capture system according to claim 1, wherein said filter extends mainly within a plane which is horizontal.

18. The capture system according to claim 1, wherein said filter extends mainly within a plane which forms, with a horizontal plane, a non-zero angle β which is less than or equal to 90°.

19. The capture system according to claim 1, wherein said storage container comprises a closure mechanism which prevents the particles from coming into contact with an external operator.

20. The capture system according to claim 1, wherein said vacuum source is disposed on the part of said circuit which connects said braking system to said filtration system.

* * * * *